Patented May 12, 1953

2,638,180

UNITED STATES PATENT OFFICE 2,638,180

AIR FILTER

Herbert Herkimer, New York, N. Y.

No Drawing. Application December 21, 1949,
Serial No. 134,358

4 Claims. (Cl. 183—45)

This invention relates to air cleaning and the killing of bacteria on solid particles such as dusts and smokes and more particularly to viscous liquid materials for use on fiber glass air filters of the impingement type. Such filters are found in use for a variety of systems notably in air conditioning systems and in forced warm-air heating installations to mention only a few.

One object of the invention is to provide a filter or adhesive compound for such fiber filters which will possess properties both for the removal of dust particles and for the killing of bacteria that may be present on the dust particles.

Another object is to provide such a filter material which will remove as large a variety of types of dust as possible.

Yet a still more important object is to insure that dust particles which have been trapped and are inevitably shaken loose from the filter will be sterilized before re-entering the air stream.

Air contaminants differ among themselves in almost an infinite number of ways. For instance dusts, which are generally considered as being particles of less than 100 microns in size, may be of mineral, animal or vegetable origin. Bacteria generally range from about 0.2 to 5 microns, fungus spores from 1 to 10 microns and pollen from 5 to 150 microns. It is well known that the great majority of bacteria found in air are attached to much larger particles than they themselves so that if the dust is removed from incoming or recycled air the bacteria are largely removed with the dust.

In practice no filter that is cheap enough to be used in ordinary air conditioning or heating systems retains the dust so perfectly that conglomerates do not occasionally shake loose for one reason or another and re-enter the air stream. When this situation occurs it is not merely as though the filtration were imperfect as far as bacteria are concerned. Instead it may be that the number of bacteria re-introduced into the room or other space is greater than the number of bacteria originally trapped by the filter. This is due to the fact that the accumulation on the filter frequently is a concentrated supply of nutrients for the bacteria so that the filter becomes an ideal breeding ground. These facts are not apparent to the user unless the air is regularly sampled which is impossible for the average householder to accomplish.

The use of bactericides may be suggested but those which are of an all-purpose nature such as phenol and the like are of unpleasant odor or require the use of easily evaporated liquids which dry out on the filter or fire hazards or generally lack the necessary stability.

To overcome these difficulties I employ an emulsion of an oily viscous non-inflammable substantially non-volatile liquid such as tricresyl phosphate and a viscous hydrophilic bactericidal liquid such as a free or uncombined glycol, preferably propylene glycol, due to its greater solubility in tricresyl phosphate. Although a simple emulsion of these two materials may be employed for reasons stated below and in spite of the fact that such an emulsion is unstable, I may employ emulsifying agents such as those of the quaternary ammonium type one of which is known as "Zephiran."

While the properties of the oil or "dope" such as tricresyl phosphate to the glycol are not thought to be critical, the following is an example of the composition of an emulsion suitable for impregnating or treating a conventional glass fiber filter 20 inches square and one inch thick.

| | Grams |
|---|---|
| Tricresyl phosphate | 60 |
| Propylene glycol | 10 |
| "Zephiran" | 0.1 |

Such an emulsion is not completely stable but is sufficiently homogeneous to be sprayed into the fiber mat. One of the advantages of the unstable emulsion is that the tricresyl phosphate will trap virtually all types of solids and impart to them a partial coating of oil. This action does not materially affect organisms which have a large water content, but due to the close proximity of the glycol the organism is dehydrated. Thus it may be said that the tricresyl phosphate traps the vehicle for the bacteria and holds the bacteria in a more or less stagnant film of glycol vapor where the organism is killed, thereby reducing the need for great masses of glycol vapor in air stream.

While the presence of a quaternary ammonium compound or invert soap may exhibit no bactericidal action in the ordinary functioning of the filter its presence is more important in the disposal of the filter. Ordinarily such a filter is discarded and disposed of after a period of about a month or until about 250 grams of dust has been accumulated. If this is done the accumulation is still oily so that normally there is little danger of the loss of dust or bacteria to the surrounding air. However, attendants, especially for small installations, frequently allow the filter to continue in use until the dust is in such large amounts that it is no longer thoroughly wet by the oil or tricresyl phosphate and is more of the nature of a dry lint. Such a condition reduces the effectiveness of the filter and the general operation of the heating or cooling system of course, but it occurs nonetheless. If the filter "dope" contains such an invert soap as an emulsifier the filter and its accumulation may be wet with water both to prevent flying dust and to enable the lowering of the surface tension of the water which enables the invert soap to function most effectively as a bactericide. Since the invert soaps are effective at extremely dilute concentrations the water-wet filter will then be sterile as well as free from loose dust during its disposal.

An emulsion of tricresyl phosphate and glycol, if the latter is present in amounts less than fifty per cent, presents substantially no fire hazard, and appears to present no difficulty over the ordinary humidity ranges encountered. Glass is preferentially wet by propylene glycol and others such as ethylene glycol and diethylene glycol rather than by tricresyl phosphate although the interfacial tension between the glycol and phosphate is not great. Consequently to a considerable extent, each filter fiber may be considered to be covered by a film of glycol and, the glycol film in turn being covered to a great degree by tricresyl phosphate. Since tricresyl phosphate is a flame retardant it may be said that the outer coating "flame proofs" the glycol.

I am aware the glycol vapors and mists injected into the air stream have been found to reduce the incidence of certain ailments, especially colds, in subjects using such treated air. My filters do not depend on any such action. In fact it might even be said that the presence of tricresyl phosphate prevents the evaporation of the glycol. The action I utilize is sterilization of the bacteria by trapping the vehicle (dust) on tricresyl phosphate in close proximity to glycol vapor or liquid and of course a certain amount of glycol dissolved in the tricresyl phosphate. The reason for this is to prevent loosened dust from carrying bacteria into the air stream. Finally the dust is sterilized by the action of invert soaps and water at the time of disposal in the event the filter has been overloaded.

I claim as my invention:

1. A method for the control of bacteria within a given air space comprising the impingement of a part of the air against a filter coated with a mixture of tricresyl phosphate, a free liquid glycol and a quaternary ammonium invert soap until the filter is dusty and then wetting the filter with water before disposal of the filter.

2. A composition for coating air filters consisting of a heterogeneous mixture of tricresyl phosphate and a free liquid glycol, the weight of glycol being less than 50% of the weight of the mixture.

3. An air filter comprising glass fibers, a free liquid glycol substantially covering and in contact with the fibers, and tricresyl phosphate as a second coat covering at least a part of the glycol.

4. A composition for coating air filters comprising six parts by weight of tricresyl phosphate one part by weight of free propylene glycol, and a small amount of a quaternary ammonium invert soap as an emulsifier.

HERBERT HERKIMER.

References Cited in the file of this patent

UNITED STATES PATENTS

| Number | Name | Date |
|---|---|---|
| 2,122,514 | Crocker et al. | July 5, 1938 |
| 2,199,385 | Bass | May 7, 1940 |
| 2,347,031 | Cupery | Apr. 18, 1944 |
| 2,469,285 | White | May 3, 1949 |